United States Patent
Wang

(10) Patent No.: US 10,110,718 B2
(45) Date of Patent: Oct. 23, 2018

(54) MOBILE TERMINAL STOPPER EJECTION SYSTEM, MOBILE TERMINAL AND MOBILE TERMINAL STOPPER EJECTION METHOD

(71) Applicant: ZTE Corporation, Shenzhen, Guangdong (CN)

(72) Inventor: Desheng Wang, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 71 days.

(21) Appl. No.: 15/509,948

(22) PCT Filed: Dec. 30, 2014

(86) PCT No.: PCT/CN2014/095696
§ 371 (c)(1),
(2) Date: Mar. 9, 2017

(87) PCT Pub. No.: WO2015/131649
PCT Pub. Date: Sep. 11, 2015

(65) Prior Publication Data
US 2017/0302767 A1    Oct. 19, 2017

(30) Foreign Application Priority Data

Sep. 16, 2014 (CN) .......................... 2014 1 0473302

(51) Int. Cl.
*H04B 1/38* (2015.01)
*H04M 1/02* (2006.01)
(Continued)

(52) U.S. Cl.
CPC ............ *H04M 1/026* (2013.01); *H01F 7/064* (2013.01); *H01F 7/08* (2013.01); *H01R 13/633* (2013.01);
(Continued)

(58) Field of Classification Search
CPC .............. H04M 1/026; H04M 2250/14; H04B 1/3818; H01F 7/064; H01F 7/08; H01R 13/633
(Continued)

(56) References Cited

U.S. PATENT DOCUMENTS

| 6,035,216 | A | * | 3/2000 | Cheng | H04B 1/3816 235/475 |
| 8,121,644 | B2 | * | 2/2012 | Yang | H04M 1/0202 439/626 |
| 8,634,882 | B2 | | 1/2014 | Ahn | |
| 2011/0009167 | A1 | | 1/2011 | Yang | |

(Continued)

FOREIGN PATENT DOCUMENTS

| CN | 2735666 Y | 10/2005 |
| CN | 1913235 A | 2/2007 |

(Continued)

OTHER PUBLICATIONS

International Search Report in international application No. PCT/CN2014/095696, dated Jun. 23, 2015, 2 pgs.
(Continued)

*Primary Examiner* — Sonny Trinh
(74) *Attorney, Agent, or Firm* — Cooper Legal Group, LLC

(57) ABSTRACT

A mobile terminal stopper ejection system is described, and includes a bracket and a stopper body which may be placed in the bracket, wherein a limiting lug boss is arranged on an inner side of a sidewall of the bracket, the limiting lug boss is partially or totally a magnetic substance, the stopper body is provided with an accommodation space, a limiting groove corresponding to the limiting lug boss is formed in an outer wall of the stopper body, the stopper body is fixed in the bracket by clamping between the limiting lug boss and the limiting groove, an ejecting spring is arranged between the stopper body and the bracket, the ejecting spring is arranged
(Continued)

to eject the stopper body, the system further includes a magnetic module, and the magnetic module is an electromagnetic module, and attracts the limiting lug boss to be separated from the limiting groove when being energized. The system for ejecting the stopper of the mobile terminal implements automatic ejecting of the stopper of the mobile terminal.

14 Claims, 2 Drawing Sheets

(51) Int. Cl.
  *H04B 1/3818* (2015.01)
  *H01F 7/06* (2006.01)
  *H01F 7/08* (2006.01)
  *H01R 13/633* (2006.01)
  *H01R 13/443* (2006.01)

(52) U.S. Cl.
  CPC ......... *H04B 1/3818* (2015.01); *H01R 13/443* (2013.01); *H04M 2250/14* (2013.01)

(58) Field of Classification Search
  USPC .................................. 455/558, 575.1, 550.1
  See application file for complete search history.

(56) References Cited

U.S. PATENT DOCUMENTS

| | | | |
|---|---|---|---|
| 2011/0045877 A1 | 2/2011 | Ahn | |
| 2011/0070929 A1* | 3/2011 | Li | H04B 1/3818 455/575.1 |
| 2013/0116009 A1* | 5/2013 | Schwandt | G06K 19/07732 455/558 |
| 2014/0179135 A1 | 6/2014 | Hsu | |

FOREIGN PATENT DOCUMENTS

| | | |
|---|---|---|
| CN | 101958940 A | 1/2011 |
| CN | 201781707 U | 3/2011 |
| CN | 202495630 U | 10/2012 |
| CN | 103367974 A | 10/2013 |
| CN | 203340126 U | 12/2013 |

OTHER PUBLICATIONS

English Translation of the Written Opinion of the International Search Authority in international application No. PCT/CN2014/095696, dated Jun. 23, 2015, 6 pgs.

Supplementary European Search Report in European application No. 14884385.7, dated Aug. 31, 2017, 9 pgs.

* cited by examiner

MOBILE TERMINAL STOPPER EJECTION SYSTEM, MOBILE TERMINAL AND MOBILE TERMINAL STOPPER EJECTION METHOD

TECHNICAL FIELD

The disclosure relates to a system for ejecting a stopper of a mobile terminal, the mobile terminal and a method for ejecting the stopper of the mobile terminal.

BACKGROUND

Common stoppers for mobile terminals, such as mobile phones, may be divided into a mobile storage card-T card stopper, a Subscriber Identity Module (SIM) card stopper, a coaxial stopper and the like according to functions, and may be divided into a Thermoplastic PolyUrethane (TPU) stopper, a TPU+PolyCarbonate (PC) stopper, a PC stopper, a metal stopper and the like according to materials and manufacturing processes.

At present, the stoppers include a fastening open stopper and a pin-poking stopper according to extraction manners. The fastening open stopper is provided with a fastener, and the stopper is extracted by manually opening the fastener. For convenient manual opening, the fastener is relatively large in size and inaesthetic, frequent opening may easily damage the fastener to make it impossible to continue extracting the stopper, and the damaged stopper brings more influence on appearance of a mobile phone. The pin-poking stopper is arranged in a mobile phone, and is required to be inserted into a small hole in the mobile phone to implement ejecting of the pin-poking stopper in a pushing and pressing manner by virtue of a tool such as a pin, and adoption of the pin-poking stopper may frequently cause the condition that the stopper may not be extracted because an auxiliary tool is not carried as well as difficulties in operation.

SUMMARY

Embodiments of the disclosure provide a system for ejecting a stopper of a mobile terminal, the mobile terminal and a method for ejecting the stopper of the mobile terminal, so as to solve the technical problem of how to implement automatic ejecting of the stopper of the mobile terminal.

In order to solve the technical problem, an embodiment of the disclosure provides a system for ejecting a stopper of a mobile terminal, which includes a bracket and a stopper body which is placed in the bracket, wherein a limiting lug boss is arranged on an inner side of a sidewall of the bracket, and the limiting lug boss is partially or totally a magnetic substance;

the stopper body is provided with an accommodation space, a limiting groove corresponding to the limiting lug boss is formed in an outer wall of the stopper body, and the stopper body is fixed in the bracket by clamping between the limiting lug boss and the limiting groove;

an ejecting spring is arranged between the stopper body and the bracket, and the ejecting spring is arranged to eject the stopper body; and the system further includes a magnetic module, wherein the magnetic module is an electromagnetic module, and attracts the limiting lug boss to be separated from the limiting groove when being energized.

Alternatively, a first lug boss may further be arranged on the inner side of the sidewall of the bracket; and a second lug boss may further be arranged on the outer wall of the stopper body; when the limiting lug boss is clamped with the limiting groove, the second lug boss may be positioned below the first lug boss, and the second lug boss may form spaced buckling with the first lug boss.

Alternatively, an elastic groove may be formed in an inner side of a connecting part of the sidewall of the bracket with the limiting lug boss and a bottom edge of the bracket.

Alternatively, the bracket may be a U-shaped bracket.

Alternatively, the limiting lug boss may be arranged on one sidewall of the U-shaped bracket, and the first lug boss may be arranged on an other sidewall of the U-shaped bracket.

Alternatively, limiting lug bosses may be arranged on one sidewall or two sidewalls of the U-shaped bracket.

Alternatively, a support pillar may further be arranged at a front end of the stopper body, and the ejecting spring may be arranged on the support pillar in a sleeving manner.

Alternatively, the mobile terminal may be a mobile phone.

In order to solve the technical problem, an embodiment of the disclosure further provides a mobile terminal, which includes a mobile terminal body, a control module, a detection module and the abovementioned system for ejecting the stopper of the mobile terminal arranged in the mobile terminal body, wherein the detection module is arranged to send a notification to the control module after detecting a stopper ejecting instruction; and the control module is arranged to receive the notification, and control a magnetic module in the system for ejecting the stopper of the mobile terminal to generate magnetism.

Alternatively, a bracket of the system for ejecting the stopper of the mobile terminal and the mobile terminal body may be detachably connected or integrally formed.

Alternatively, the mobile terminal may be a mobile phone.

In order to solve the technical problem, an embodiment of the disclosure further provide a method for ejecting a stopper of a mobile terminal, wherein the mobile terminal is the abovementioned mobile terminal, and the method includes that:

a detection module of the mobile terminal detects a stopper ejecting instruction;

a control module in the mobile terminal receives a detection result, and activates a magnetic module to generate magnetism; and a system for ejecting the stopper of the mobile terminal in the mobile terminal ejects a stopper body under an action of the magnetism.

Alternatively, the step of detecting the stopper ejecting instruction may include that: a touch over a stopper ejecting application is detected, a preset voice is detected or a preset gesture in a specified area of a touch screen is detected.

Alternatively, the mobile terminal may be a mobile phone.

The embodiments of the disclosure have the following beneficial effects:

the magnetic module is added in the system for ejecting the stopper in embodiments of the disclosure, and the U-shaped bracket and ejecting of the stopper body are controlled to implement extraction of the stopper by virtue of the magnetism, so that appearance of the stopper of the mobile terminal is optimized, an auxiliary tool such as a fastener and a small hole in an original stopper is cancelled, simplicity and convenience for operation are achieved, a conventional extraction manner for the stopper of the mobile terminal is broken, the mobile terminal is endowed with a new function, and a totally new experience is brought to a user.

DETAILED DESCRIPTION

The embodiments of the disclosure will be described below with reference to the drawings in detail. It is important to note that the embodiments of the disclosure and characteristics in the embodiments may be freely combined under the condition of no conflicts.

Descriptions will be made with a mobile phone as an example in the following embodiments.

Figure 1:
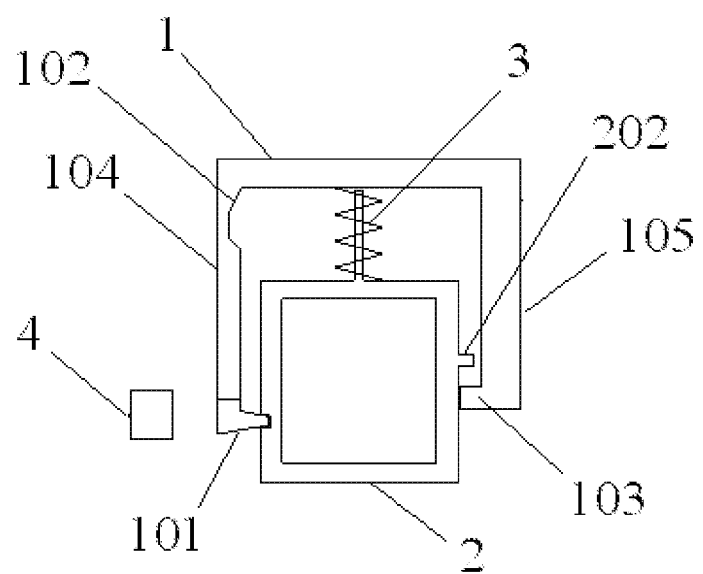
FIG. 1 is a structure diagram of a system for ejecting a stopper of a mobile phone according to an embodiment of the disclosure.
Figure 2:
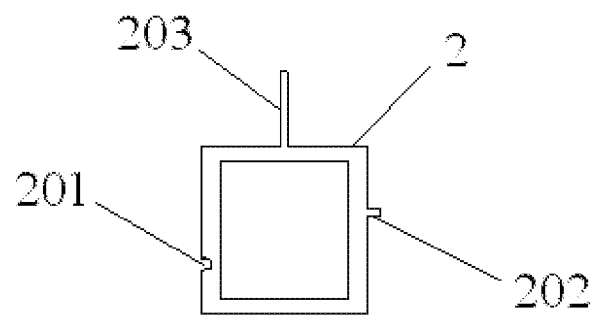
FIG. 2 is a structure diagram of a stopper body in a system for ejecting a stopper of a mobile phone according to an embodiment of the disclosure.
Figure 3:
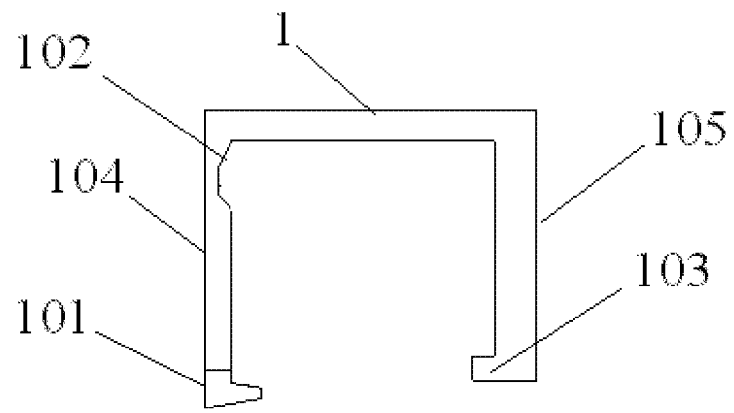
FIG. 3 is a structure diagram of a U-shaped bracket in a system for ejecting a stopper of a mobile phone according to an embodiment of the disclosure.

In the embodiments shown in FIG. 1, FIG. 2 and FIG. 3, a system for ejecting a stopper of a mobile phone includes a bracket 1 and a stopper body 2 placed in the bracket.

As shown in FIG. 3, the bracket 1 is a U-shaped bracket 1, and is provided with an opening. A limiting lug boss 101 which extends along an inner side is arranged at an end part of a sidewall 104 of the U-shaped bracket 1. Alternatively, or limiting lug bosses 101 are arranged on both sidewalls of the U-shaped bracket 1. When the sidewalls of the U-shaped bracket 1 are prolonged, the limiting lug bosses 101 may contact with a lower edge of the stopper body 2. The limiting lug boss 101 is a magnetic substance, and may generate magnetism. An elastic groove 102 is formed in an inner side of a connecting part of the sidewall 104 of the U-shaped bracket and a bottom of the U-shaped bracket 1. For facilitating elastic extension of the sidewall 104 towards an outer side, the elastic groove 102 is thinner than the sidewall 104 and the bottom of the U-shaped bracket 1. For facilitating elastic extension of the end part of the sidewall 104 towards the outer side, a first lug boss 103 which extends along an inner side is arranged at an end part of an other sidewall 105 of the U-shaped bracket.

As shown in FIG. 2, the stopper body 2 is a rectangular frame, and a rectangular accommodation space is formed in a middle part thereof. The stopper is fixed in the accommodation space, and the stopper includes a SIM card stopper or a T card stopper. A limiting groove 201 corresponding to the limiting lug boss 101 is formed in a middle upper part of an outer wall of one side of the stopper body 2. The stopper body 2 is fixed in the U-shaped bracket 1 by clamping between the limiting lug boss 101 and the limiting groove 201. A second lug boss 202 which extends along an outer side is arranged at a middle lower part of the other side edge of the stopper body 2. A support pillar 203 is arranged at a middle part of a bottom edge of the stopper body 2, and is arranged to fix an ejecting spring 3.

As shown in FIG. 1, the support pillar 203 at a front end of the stopper body 2 is sleeved with the ejecting spring 3. The stopper body 2 is inserted into the U-shaped bracket 1. The sidewall 104 elastically extends towards the outer side at this moment to compress the ejecting spring 3 between the bottom edge of the stopper body 2 and the bottom of the U-shaped bracket 1 until the limiting lug boss 101 on the sidewall 104 of the U-shaped bracket is clamped into the limiting groove 201 in the stopper body 2 for fixation. The first lug boss 103 on the other sidewall 105 of the U-shaped bracket is positioned above the second lug boss 202 on the side edge of the stopper body 2. A gap is formed between the first lug boss 103 and the second lug boss 202. The first lug boss 103 forms spaced buckling with the second lug boss 202, and the spaced buckling refers to that: when the bottom edge of the stopper body 2 is ejected under an action of a thrust of the ejecting spring 3, the stopper body 2 is ejected by a certain distance, and then the second lug boss 202 on the stopper body 2 is pressed against the first lug boss 103 on the U-shaped bracket 1. A magnetic module 4 is arranged at the same horizontal line with the limiting lug boss 101 on the outer side of the sidewall 104 of the U-shaped bracket, the magnetic module 4 is an electromagnetic module, and a magnetic field formed after energization and a magnetic field of the limiting lug boss 101 are mutually attracted to separate the limiting lug boss 101 from the limiting groove 201.

In the embodiments of the disclosure, the bracket may also be in another shape, and may be detachably connected or integrally formed with a mobile phone body. The first lug boss 103 may also be directly arranged on the mobile phone body to limit the stopper body 2 and prevent the stopper body 2 from being ejected out of the mobile phone body, and is arranged together with the limiting lug boss 101 on two sides of the mobile phone body respectively.

The embodiments of the disclosure further provide a mobile phone, which includes a mobile phone body and the abovementioned system for ejecting the stopper of the mobile phone. A cavity for accommodating the ejecting system is formed in the mobile phone body, the cavity is provided with an opening, an inner wall of the cavity is fixed with a U-shaped bracket 1 of the ejecting system. A control module is further arranged in the mobile phone body, the control module may receive a touch of a user over a stopper ejecting application, preset voice, specific gesture in a specified area of a touch screen or the like detected by a detection module of the mobile phone body, and the control module controls a magnetic module in the ejecting system to generate magnetism for a period of time.

Figure 4:
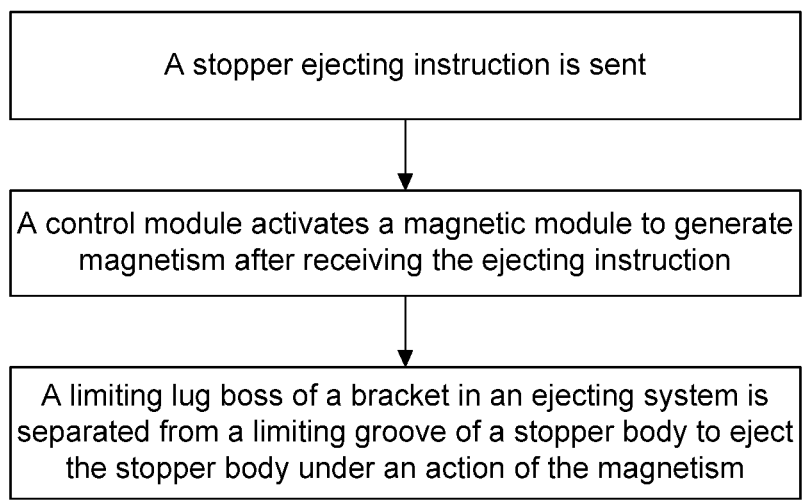
FIG. 4 is a flow chart of a method for ejecting a stopper of a mobile phone according to an embodiment of the disclosure.

As shown in FIG. 4, a method for ejecting a stopper of a mobile phone is provided. The mobile phone has the abovementioned structure. The method includes the following steps.

1) A detection module of the mobile phone sends a notification to a control module in the mobile phone after detecting a stopper ejecting instruction sent by a user, wherein sending of the stopper ejecting instruction may be a condition such as a touch over a stopper ejecting application, production of a preset voice or a specific gesture in a specified area of a touch screen.

2) The control module in the mobile phone activates a magnetic module to generate magnetism after receiving the notification.

3) A system for ejecting a stopper of the mobile phone in the mobile phone ejects a stopper body under an action of the magnetism, including that: the magnetism attracts a limiting lug boss 101 on one sidewall of a U-shaped bracket 1 to move towards an outer side to separate the limiting lug boss 101 from a limiting groove 201 of the stopper body 2; a bottom edge of the stopper body 2 is ejected under an action of a thrust of an ejecting spring 3, and after the stopper body 2 is ejected by a certain distance, a second lug boss 202 on the stopper body 2 is pressed against a first lug boss 103 on the U-shaped bracket 1 to block and stop the stopper body from being continued to be ejected by the first lug boss 103; and a length and elastic strength of the ejecting spring 3 may also be limited to disable the stopper body 2 to be completely ejected from the U-shaped bracket 1 under an action of elasticity.

After the operations are completed, for example, a SIM card, a T card or the like is extracted, the stopper body 2 may be manually pushed into the mobile phone to make the limiting groove 201 of the stopper body contact with the limiting lug boss on the U-shaped bracket and fixed with the limiting lug boss to implement resetting of the stopper boss.

Although the above is the implementation mode disclosed by the disclosure, the content is only the implementation mode adopted to make the disclosure conveniently understood and not intended to limit the disclosure. Those skilled in the art may make any modification and variation to an implementation form and details without departing from the spirit and scope of the disclosure, but the scope of protection of the patent of the disclosure is still required to be subject to the scope defined by the appended claims.

INDUSTRIAL APPLICABILITY

A magnetic module is added in a system for ejecting a stopper in above technical solutions, and a U-shaped bracket and ejecting of a stopper body are controlled to implement extraction of the stopper by virtue of the magnetism, so that appearance of the stopper of the mobile terminal is optimized, an auxiliary tool such as a fastener and a small hole in an original stopper is cancelled, simplicity and convenience for operation are achieved, a conventional extraction manner for the stopper of the mobile terminal is broken, the mobile terminal is endowed with a new function, and a totally new experience is brought to a user.

What is claimed is:

1. A system for ejecting a stopper of a mobile terminal, comprising a bracket and a stopper body which is placed in the bracket, wherein
a limiting lug boss is arranged on an inner side of a sidewall of the bracket, and the limiting lug boss is partially or totally a magnetic substance;
the stopper body is provided with an accommodation space, a limiting groove corresponding to the limiting lug boss is formed in an outer wall of the stopper body, and the stopper body is fixed in the bracket by clamping between the limiting lug boss and the limiting groove;
an ejecting spring is arranged between the stopper body and the bracket, and the ejecting spring is arranged to eject the stopper body; and
further comprising a magnetic module, wherein the magnetic module is an electromagnetic module, and attracts the limiting lug boss to be separated from the limiting groove when being energized.

2. The system for ejecting the stopper of the mobile terminal according to claim 1, wherein
a first lug boss is further arranged on the inner side of the sidewall of the bracket; and
a second lug boss is further arranged on the outer wall of the stopper body; when the limiting lug boss is clamped with the limiting groove, the second lug boss is positioned below the first lug boss, and the second lug boss forms spaced buckling with the first lug boss.

3. The system for ejecting the stopper of the mobile terminal according to claim 1, wherein
an elastic groove is formed in an inner side of a connecting part of the sidewall of the bracket with the limiting lug boss and a bottom edge of the bracket.

4. The system for ejecting the stopper of the mobile terminal according to claim 1, wherein
the bracket is a U-shaped bracket.

5. The system for ejecting the stopper of the mobile terminal according to claim 4, wherein
the limiting lug boss is arranged on one sidewall of the U-shaped bracket, and the first lug boss is arranged on an other sidewall of the U-shaped bracket.

6. The system for ejecting the stopper of the mobile terminal according to claim 4, wherein
limiting lug bosses are arranged on one sidewall or two sidewalls of the U-shaped bracket.

7. The system for ejecting the stopper of the mobile terminal according to claim 1, wherein
a support pillar is further arranged at a front end of the stopper body, and the ejecting spring is arranged on the support pillar in a sleeving manner.

8. The system according to claim 1, wherein the mobile terminal is a mobile phone.

9. A mobile terminal, comprising a mobile terminal body, a control module, a detection module and a system for ejecting a stopper of a mobile terminal arranged in the mobile terminal body, wherein the system for ejecting the stopper of the mobile terminal comprises: a bracket and a stopper body which is placed in the bracket, wherein a limiting lug boss is arranged on an inner side of a sidewall of the bracket, and the limiting lug boss is partially or totally a magnetic substance; the stopper body is provided with an accommodation space, a limiting groove corresponding to the limiting lug boss is formed in an outer wall of the stopper body, and the stopper body is fixed in the bracket by clamping between the limiting lug boss and the limiting groove; an ejecting spring is arranged between the stopper body and the bracket, and the ejecting spring is arranged to eject the stopper body; and the system for ejecting the stopper of the mobile terminal further comprises a magnetic module, wherein the magnetic module is an electromagnetic module, and attracts the limiting lug boss to be separated from the limiting groove when being energized; wherein
the detection module is arranged to send a notification to the control module after detecting a stopper ejecting instruction; and
the control module is arranged to receive the notification, and control the magnetic module in the system for ejecting the stopper of the mobile terminal to generate magnetism.

10. The mobile terminal according to claim 9, wherein a bracket of the system for ejecting the stopper of the mobile terminal and the mobile terminal body are detachably connected or integrally formed.

11. The mobile terminal according to claim 9, wherein the mobile terminal is a mobile phone.

12. A method for ejecting a stopper of a mobile terminal, wherein the mobile terminal comprises a mobile terminal body, a control module, a detection module and a system for ejecting a stopper of a mobile terminal arranged in the mobile terminal body, wherein the system for ejecting the stopper of the mobile terminal comprises: a bracket and a stopper body which is placed in the bracket, wherein a limiting lug boss is arranged on an inner side of a sidewall of the bracket, and the limiting lug boss is partially or totally a magnetic substance; the stopper body is provided with an accommodation space, a limiting groove corresponding to the limiting lug boss is formed in an outer wall of the stopper body, and the stopper body is fixed in the bracket by clamping between the limiting lug boss and the limiting groove; an ejecting spring is arranged between the stopper body and the bracket, and the ejecting spring is arranged to eject the stopper body; and the system for ejecting the stopper of the mobile terminal further comprises a magnetic module, wherein the magnetic module is an electromagnetic module, and attracts the limiting lug boss to be separated from the limiting groove when being energized; wherein the detection module is arranged to send a notification to the control module after detecting a stopper ejecting instruction; and the control module is arranged to receive the notification, and control the magnetic module in the system for ejecting the stopper of the mobile terminal to generate magnetism, the method comprising:

detecting, by the detection module of the mobile terminal, a stopper ejecting instruction;

receiving, by the control module in the mobile terminal, a detection result, and activating the magnetic module to generate magnetism; and ejecting, by the system for ejecting the stopper of the mobile terminal in the mobile terminal, a stopper body under an action of the magnetism.

13. The method according to claim 12, wherein the step of detecting the stopper ejecting instruction comprises: detecting a touch over a stopper ejecting application, detecting a preset voice or detecting a preset gesture in a specified area of a touch screen.

14. The method according to claim 12, wherein the mobile terminal is a mobile phone.

* * * * *